United States Patent Office 3,440,897
Patented Apr. 29, 1969

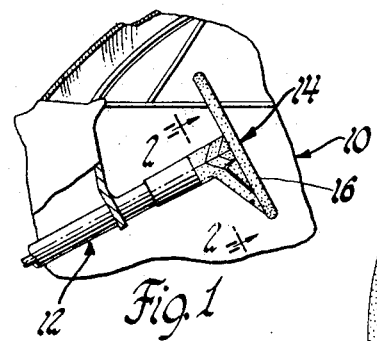
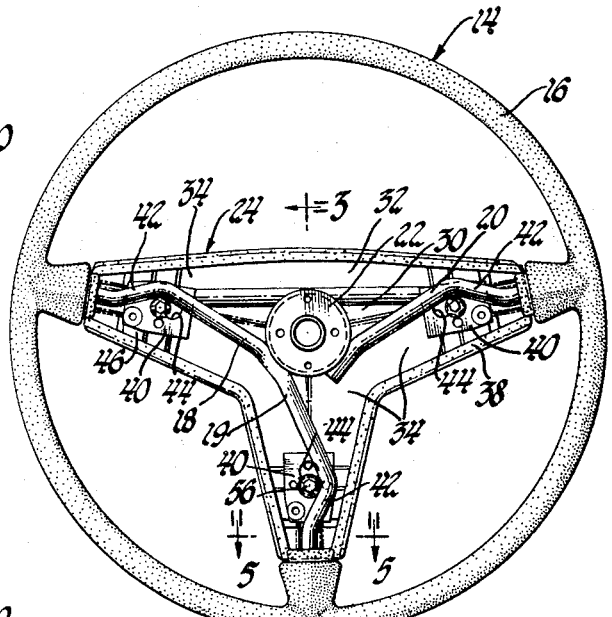
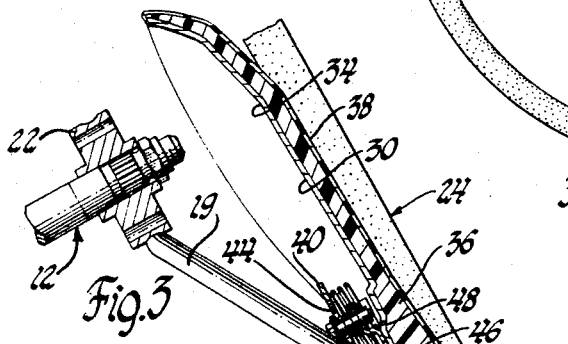
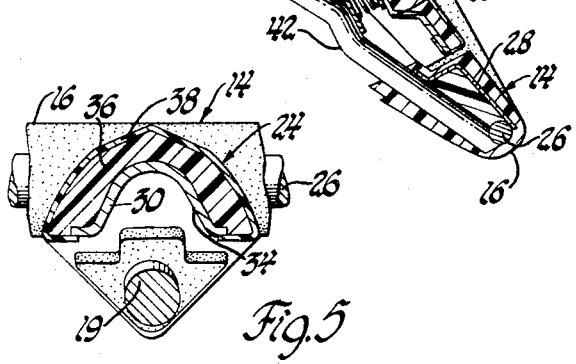
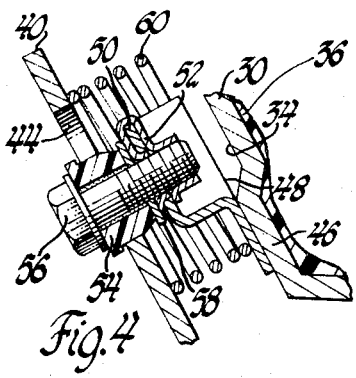
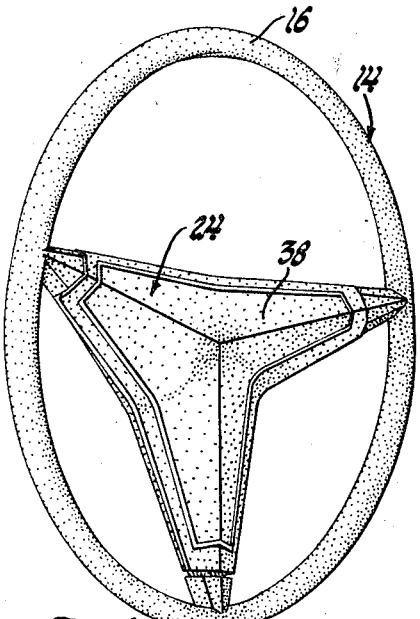

3,440,897
ENERGY ABSORBING STEERING WHEEL
Herbert V. Dutt, Kettering, and Harland R. Fosnaugh, Dayton, Ohio, assignors to General Motors Corporation, Detroit, Mich., a corporation of Delaware
Filed Sept. 15, 1967, Ser. No. 668,036
Int. Cl. B62d 1/04
U.S. Cl. 74—552           6 Claims

ABSTRACT OF THE DISCLOSURE

A steering wheel includes a rim, a hub and three spokes interconnecting the rim and the hub. A padded support overlies the hub and spokes. A cantilever bracket on each spoke is provided with a radially elongated slot. A headed stud is mounted on each of the arms of the support and extends through the slot, with a coil compression spring seating on the support and on the cantilever bracket to axially locate the support and hold the heads of the studs against the brackets to each side of the slots. Impact loads received by the support are transmitted by engagement of the support with the brackets to each of the spokes to bend the spokes inwardly relative to the hub and absorb energy.

---

This invention relates to steering wheels and more particularly to energy absorbing steering wheels.

One feature of this invention is that it provides a steering wheel having at least three spokes and a substantially undeformable member mounted on the spokes for receiving impact loads and transferring such loads to the spokes to bend the spokes as a unit relative to the steering wheel hub and thereby absorb energy. Another feature is that the mounting means for the undeformable member accommodate relative movement between the spokes and the undeformable member as the spokes bend relative to the hub. A further feature is that the mounting means normally locate the undeformable member in spaced relationship to the spokes and permit displacement thereof within a predetermined limit without bending of the spokes. Yet another feature is that the mounting means locate the undeformable member against rotary movement relative to the spokes.

These and other features of the door lock of this invention will be readily apparent from the following specification and drawings wherein:

FIGURE 1 is a partial view of a vehicle body having a steering wheel according to this invention mounted therein;

FIGURE 2 is an enlarged rear elevational view taken generally along the plane indicated by line 2—2 of FIGURE 1;

FIGURE 3 is an enlarged sectional view taken generally along the plane indicated by line 3—3 of FIGURE 2;

FIGURE 4 is an enlarged view of a portion of FIGURE 3;

FIGURE 5 is an enlarged sectional view taken generally along the plane indicated by line 5—5 of FIGURE 2; and FIGURE 6 is a front perspective view.

Referring now to FIGURE 1, a vehicle body, designated generally 10, includes a steering column assembly 12 which extends from the vehicle steering gear, not shown, upwardly and rearwardly within the body compartment and is connected at its upper end to a steering wheel 14 according to this invention.

Generally the steering wheel 14 includes a rim 16, three members or spokes 18, 19 and 20 interconnecting the rim and the hub 22, and a substantially undeformable member or support 24 which is mounted on the spokes, as will be described, for receiving impact loads and transmitting such loads to the spokes to bend the spokes relative to the hub and thereby absorb energy. The hub 22 is splined to the upper end of the steering shaft in a conventional manner as shown in FIGURE 3 to mount the steering wheel on the column assembly.

The rim 16 includes a continuous rod or core 26 having its axially inner side welded to the radially outer ends of the spokes. Plates 28 extend radially inwardly from the axially outer side of the core 26 and have their flanged inner ends welded to the spokes. The spokes are provided only at the junctures of the spokes to the core. As best shown in FIGURES 2 and 3, the radially outer ends of the spokes, the core 26, and the plates 28 are encased in molded plastic or rubber.

The spokes have their radially inner ends welded to the base of an annular groove in the hub 22. Although the spokes 18 and 19 are provided by a common member, these spokes can be provided by individual members if so desired.

The support 24 includes a metal base 30 which is substantially undeformable within the range of impact loads which normally would be applied against the base. The base further includes a center portion 32 and three arm members 34 of generally V-shaped cross section, with the peak lines of the arm members merging at a common center coaxial with the axis of the hub. The arm members taper inwardly as they extend radially outwardly from the center portion 32. A layer 36 of resilient material, such as rubber or plastic, is secured to the outer surface of the base 30 and a covering 38 of plastic sheet material is secured to the layer 36, with the edge portions of the covering being secured to the inner surface of the base. The layer 36 and the covering 38 provide a pad covering the base. Although this pad is capable of absorbing some impact energy, its primary purpose is decorative rather than energy absorption. The pad conforms to the shape of the outer surface of the base and is generally of uniform thickness, except in certain areas where the base is embossed, as will be described.

Three like brackets 40 have their radially outer ends welded to offsets 42 provided in the spokes to cantilever the brackets radially outwardly on the spokes. As can be seen in FIGURES 2 and 3, the offsets 42 are coplanar although the axes of the offsets do not meet at the axial center of the hub 22. Each bracket 40 is provided with an elongated closed slot 44.

As best shown in FIGURES 3 and 4, each arm member 34 of the support 24 is provided with an embossment 46 which extends between the side walls of the arm member. A bracket 48 is welded to each embossment and provided with an apertured embossment 50 which opens radially inwardly of the bracket so that the bracket has a flange secured to the embossment 46 on only three sides. An internally threaded spring slip 52 is mounted on each of the embossments 50.

A headed plastic bushing 54 extends through each slot 44, with the head of the bushing having an OD greater than the width of the slot and the shank of the bushing having an OD generally equal to the width of the slot. A bolt 56 extends through each of the bushings and a washer 58 and is threaded into each clip 52. A coil compression spring 60 seats on each of the brackets 40 and 48 to thereby axially space these brackets in pairs and in turn axially locate the support 24 with respect to the spokes by the engagement of the heads of the bushings with the brackets 40. Adjustment of the bolts 56 adjusts the relative axial spacing of the support and spokes.

Normally the bushings are located at the radially outer ends of the slots 44 to hold the support against radial and circumferential movement relative to the spokes, but permit axial movement of the support relative to the spokes against the action of the springs 60.

The springs 60 normally absorb slight impact loads on the support 24 which may or may not be sufficient to cause the washers 58 to engage the brackets 40. If desired, the support can be used as part of the horn blowing system and the base 30 can be brought into engagement with one or more contacts on the spokes to provide the ground for the horn blowing system and blow the horn.

Under greater impact loads, such as 3000 pounds, the washers 58 will engage the brackets 40 which will function as levers since they are cantilevered on the spokes. The brackets 40 will then transfer the impact loads directly to the spokes to bend the spokes inwardly relative to the hub and thereby absorb energy. During bending of the spokes relative to the hub, the support 24 remains undeformed and the lost motion connections provided by the slots 44 and the bushings 54 permit the relative radial movement required between the support and the spokes.

The support 24 ties together all of the spokes so that an impact load of sufficient magnitude to bend one spoke is transferred to all of the spokes which then bend as a unit. This unit action of the spokes permits greater impact loads to be absorbed by the steering wheel of this invention since no one spoke must absorb all of the impact load as in other steering wheels. By not permitting one spoke to move without movement of the others, an improved steering wheel results.

Thus, this invention provides an improved steering wheel.

We claim:

1. A steering wheel comprising, in combination, an annular rim, a hub, at least three spokes extending radially between the rim and hub and secured to each to locate the hub generally centrally of the rim and in axially inwardly offset relationship thereto, a substantially undeformable member having a center portion axially covering the hub and a plurality of arms, each axially covering a respective spoke, connecting means between each respective arm and spoke for transmitting an axially applied load from the member to the spokes to bend the spokes as a unit relative to the hub as the member, the rim, and the spokes move axially inwardly relative to the hub, and means included in said connecting means to accommodate relative movement between the respective arms and spokes in directions radially of the spoges as the spokes bend relative to the hub.

2. A steering wheel comprising in combination, an annular rim, a hub, at least three spoke members extending radially between the rim and hub and secured to each to locate the hub generally centrally of the rim and in axially inwardly off-set relationship thereto, a substantially undeformable support having a center portion axially covering the hub and a plurality of arm members, each axially covering a spoke member to arrange said spoke and arm members in respective pairs, first engageable means on one member of each respective pair having a slot elongated radially of the one member, guide means on the other member of each respective pair received within the slot to locate the members of each pair circumferentially of each other, collapsible means seating on the one member and on the other member of each pair to space the members of each pair axially of each other, and second engageable means on the other member, an axially applied load to the support collapsing said collapsible means and engaging the engageable means to transfer the load therethrough from the support to the spoke members to bend the spoke members as a unit relative to the hub, the guide means moving within the slots to accommodate relative movement between the members of each respective pair as the spoke members bend relative to the hub.

3. The combination recited in claim 1 wherein the connecting means include collapsible means normally locating each respective arm and spoke in axially spaced relationship.

4. The combination recited in claim 1 wherein the accommodating means locate the rigid member and spokes against relative circumferential movement.

5. The combination recited in claim 2 wherein the collapsible means bias the respective members of each pair axially apart and the guide means locate the respective members of each pair in axially spaced relationship against the bias of the collapsible means.

6. The combination recited in claim 2 wherein the first engageable means include a cantilever bracket mounted adjacent one end thereof on each spoke member.

References Cited

UNITED STATES PATENTS

| | | | |
|---|---|---|---|
| 2,683,383 | 7/1954 | Schmid | 74—552 |
| 2,818,749 | 1/1958 | Bayko | 74—552 |
| 2,872,539 | 2/1959 | Berner | 74—552 XR |
| 2,909,941 | 10/1959 | Guest | 74—552 |
| 3,172,683 | 3/1965 | D'Antini | 74—552 |
| 3,364,785 | 1/1968 | Geller | 74—552 |

FOREIGN PATENTS 759,953  4/1954  Great Britain.

FRED C. MATTERN, JR., *Primary Examiner.*

MANUEL ANTONAKAS, *Assistant Examiner.*